US011529764B2

(12) United States Patent
Goldsmith

(10) Patent No.: US 11,529,764 B2
(45) Date of Patent: Dec. 20, 2022

(54) COATED ABRASIVE FILM BELT

(71) Applicants: SAINT-GOBAIN ABRASIVES, INC., Worcester, MA (US); SAINT-GOBAIN ABRASIFS, Conflans-Sainte-Honorine (FR)

(72) Inventor: Paul S. Goldsmith, Maynard, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 90 days.

(21) Appl. No.: 16/723,419

(22) Filed: Dec. 20, 2019

(65) Prior Publication Data

US 2020/0207026 A1 Jul. 2, 2020

Related U.S. Application Data

(60) Provisional application No. 62/786,752, filed on Dec. 31, 2018.

(51) Int. Cl.
*B29C 65/50* (2006.01)
*B24D 11/00* (2006.01)
*B24D 3/28* (2006.01)
*B29C 65/00* (2006.01)

(52) U.S. Cl.
CPC ............ *B29C 65/5042* (2013.01); *B24D 3/28* (2013.01); *B24D 11/001* (2013.01); *B29C 66/4322* (2013.01)

(58) Field of Classification Search
CPC ... B29C 65/5042; B29C 66/4322; B24D 3/28; B24D 11/001
See application file for complete search history.

(56) References Cited

U.S. PATENT DOCUMENTS

| 2,733,181 | A | * | 1/1956 | Riedesel | B29C 66/43129 |
| | | | | | 51/293 |
| 3,074,789 | A | | 1/1963 | Krogh | |
| 3,154,897 | A | * | 11/1964 | Howard | B24D 11/06 |
| | | | | | 451/531 |
| 3,763,604 | A | * | 10/1973 | Malloy | B24D 11/06 |
| | | | | | 451/531 |
| 4,027,435 | A | * | 6/1977 | Malloy | B24D 11/06 |
| | | | | | 51/295 |

(Continued)

FOREIGN PATENT DOCUMENTS

| CN | 101466499 A | 6/2009 |
| EP | 0776734 B1 | 10/1999 |

(Continued)

OTHER PUBLICATIONS

Supplementary European Search Report, Search Notes and Written Opinion dated Aug. 11, 2022 for EP 3906135 A1 (Year: 2022).*

(Continued)

*Primary Examiner* — Pegah Parvini
*Assistant Examiner* — Ross J Christie
(74) *Attorney, Agent, or Firm* — Abel Schillinger, LLP; Joseph P. Sullivan

(57) ABSTRACT

The present invention relates generally to coated abrasive articles, such as coated abrasive film belts having improved strength and durability, as well as methods of making and using said coated abrasive articles.

20 Claims, 3 Drawing Sheets

(56) References Cited

U.S. PATENT DOCUMENTS

| | | | | |
|---|---|---|---|---|
| 4,082,521 A * | 4/1978 | McGarvey | B24D 11/06 | 428/36.2 |
| 4,144,219 A * | 3/1979 | Malloy | B24D 11/06 | 524/793 |
| 4,194,618 A * | 3/1980 | Malloy | B24D 11/06 | 206/205 |
| 4,751,138 A * | 6/1988 | Tumey | C08G 59/68 | 428/323 |
| 5,355,636 A | 10/1994 | Harmon | | |
| 5,470,362 A * | 11/1995 | Gorsuch | B24D 11/06 | 451/296 |
| 5,573,619 A | 11/1996 | Benedict et al. | | |
| 5,575,873 A * | 11/1996 | Pieper | B24D 11/06 | 156/153 |
| 5,840,141 A * | 11/1998 | Korbel | B29C 66/43 | 428/110 |
| 5,924,917 A * | 7/1999 | Benedict | B29C 41/20 | 451/526 |
| 8,470,061 B2 | 6/2013 | Goldsmith et al. | | |
| 8,883,288 B2 | 11/2014 | Gaeta et al. | | |
| 2008/0295947 A1 * | 12/2008 | Bourbeau | B29C 66/1122 | 156/73.1 |
| 2009/0035519 A1 * | 2/2009 | Gaeta | B24D 3/004 | 428/143 |
| 2014/0182213 A1 * | 7/2014 | Seth | B24D 3/001 | 51/298 |

FOREIGN PATENT DOCUMENTS

| | | | | |
|---|---|---|---|---|
| GB | 1259757 A * | 1/1972 | | B24D 11/06 |
| JP | H06-190734 A | 7/1994 | | |
| KR | 100618198 B1 | 8/2006 | | |
| WO | 2014176108 A1 | 10/2014 | | |

OTHER PUBLICATIONS

International Search Report and Written Opinion for PCT/US2019/067991, dated Apr. 23, 2020, 11 pages.

* cited by examiner

COATED ABRASIVE FILM BELT

CROSS-REFERENCE TO RELATED APPLICATION

This application claims priority under 35 U.S.C. § 119(e) to U.S. Patent Application No. 62/786,752, entitled "Coated Abrasive Film Belt," by Paul S. GOLDSMITH, filed Dec. 31, 2018, which is assigned to the current assignee hereof and incorporated herein by reference in its entirety.

FIELD OF THE INVENTION

The present invention relates generally to coated abrasive articles, such as coated abrasive film belts having improved strength and durability, as well as methods of making and using said coated abrasive articles.

BACKGROUND

Abrasive articles, such as coated abrasives, are used in various industries to machine work pieces, such as by lapping, grinding, and polishing. Surface processing using abrasive articles spans a wide industrial scope from initial coarse material removal to high precision finishing and polishing of surfaces at a submicron level.

Effective and efficient abrasion of high performance metal, ceramic, and cermet industrial parts, such as drill bit components and aircraft engine parts, pose numerous processing challenges.

Industries that produce such parts are sensitive to factors that influence operational costs, including the speed at which a surface can be prepared, the cost of the materials used to prepare that surface, and the costs associated with the time expended to prepare a surface.

Therefore, there continues to be a demand for improved abrasive products and methods that can offer enhanced abrasive processing performance, efficiency, and improved surface quality.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

Figure 1:
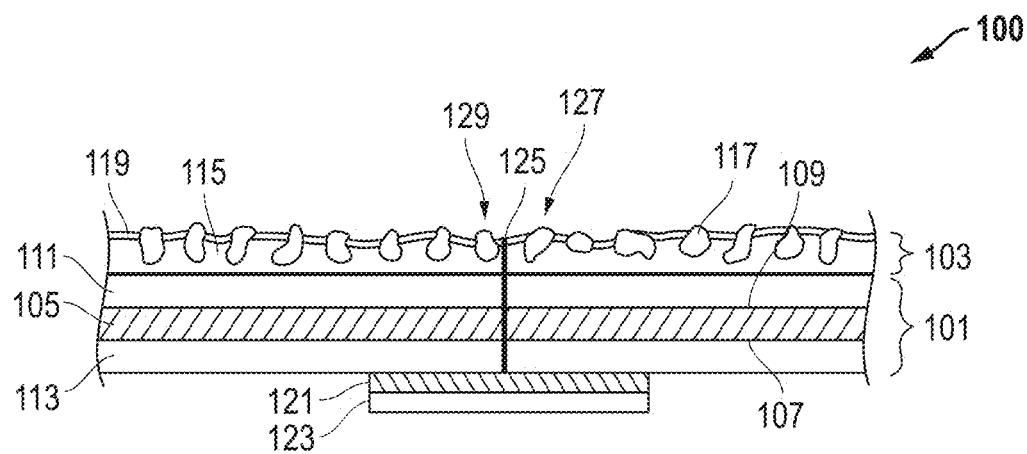
FIG. 1 is an illustration of cross-sectional view of an embodiment of a coated abrasive film belt including a joint.

The following description, in combination with the figures, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

The term "averaged," when referring to a value, is intended to mean an average, a geometric mean, or a median value. As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. As used herein, the phrase "consists essentially of" or "consisting essentially of" means that the subject that the phrase describes does not include any other components that substantially affect the property of the subject.

Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, references to values stated in ranges include each and every value within that range. When the terms "about" or "approximately" precede a numerical value, such as when describing a numerical range, it is intended that the exact numerical value is also included. For example, a numerical range beginning at "about 25" is intended to also include a range that begins at exactly 25. Moreover, it will be appreciated that references to values stated as "at least about," "greater than," "less than," or "not greater than" can include a range of any minimum or maximum value noted therein.

As used herein, the phrase "average particle diameter" can be reference to an average, mean, or median particle diameter, also commonly referred to in the art as D50.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the coated abrasive arts.

Coated Abrasive Article

FIG. 1 shows an illustration of a cross section of a coated abrasive belt 100 embodiment. As shown in FIG. 1, the coated abrasive belt can comprise an abrasive film including a joint, such as a butt joint. The abrasive film can comprise an abrasive layer 103 disposed on a backing material 101 (also called herein a "backing"). The backing material 101 can comprise a backing substrate 105 having a first major surface 109 and a second major surface 107, wherein a layer of a polymeric front coat composition 111 (also called herein a "front coat") is disposed on the first major surface 109 of the backing substrate, and wherein a layer of polymeric back coat composition 113 (also called herein a "back coat") is disposed on the second major surface 107 of the backing substrate. The abrasive layer can include a plurality of abrasive particles 117 dispersed on or in a layer of polymeric binder composition 115 (also called herein a "make coat"). The layer of polymeric binder composition 115 can be disposed in direct contact with the polymeric front coat composition 111. A layer of polymeric size coat composition 119 (also called herein a "size coat") can be disposed over the polymeric binder composition 115 and abrasive particles 117. Further, an optional layer of polymeric supersize coat composition (not shown) can be disposed over the size coat composition 119. The joint 125 can comprise a first end 127 of the abrasive film abutting a second end 129 of the abrasive film, a layer of polymeric joint adhesive 121 disposed on the back coat 113 of the first end 127 and the back coat 113 of the second end 129, and a joint tape 123 disposed over the polymeric joint adhesive 121.

Figure 2:
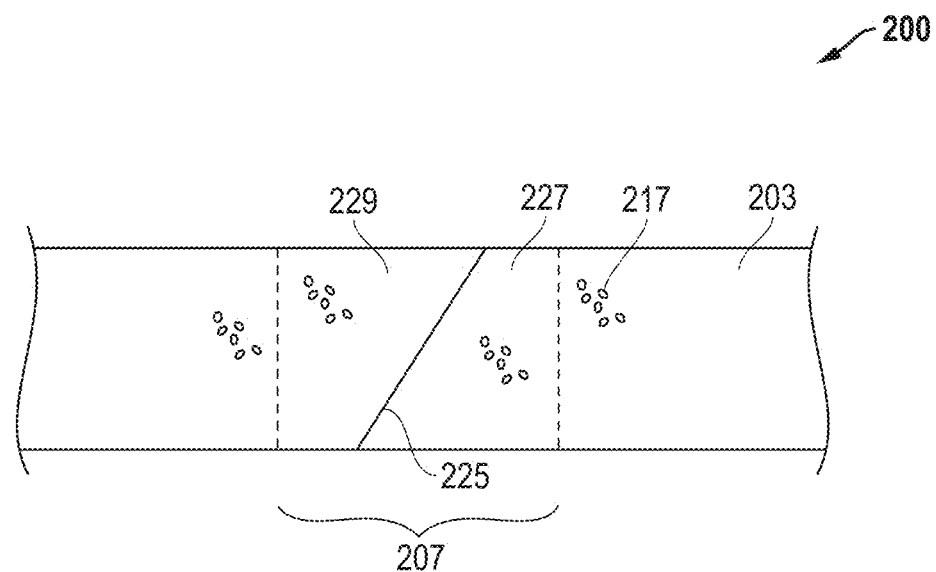
FIG. 2 is an illustration of a top view of a coated abrasive film belt including a joint.

FIG. 2 shows an illustration of a top view of a coated abrasive belt 200 embodiment. As shown in FIG. 2, the coated abrasive belt 200 can include a joint 225. The joint 225, such as a butt joint, can include a first end 227 of the abrasive film that is abutting a second end 229 of the abrasive film. A region 231 adjacent the joint 225, can be surface treated, such as by a corona treatment or other surface energy treatment. In region 231, a polymeric joint adhesive can be disposed on the underside of the abrasive film that is in contact with the back coat on the first end 227 and the back coat on the second end 229. A joint tape can be disposed overlying the polymeric joint adhesive. Abrasive particles 217 can be disposed in an abrasive layer 203, which is the working surface (also called herein the "abrasive surface" or "top surface") of the abrasive article.

Figure 3:
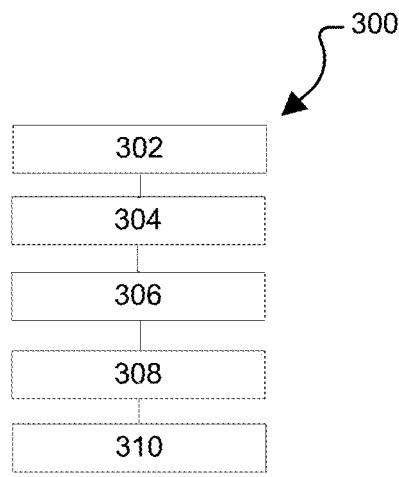
FIG. 3 is a flowchart of an embodiment of a method of making a coated abrasive film.

FIG. 3 is an illustration of a flowchart of an embodiment of a method 300 of making a coated abrasive film. Step 302 includes disposing a layer of a polymeric front coat composition (also called herein a "front coat") on a first major surface of a backing substrate. Step 304 includes disposing a layer of a polymeric back coat composition (also called herein a "back coat") on a second major surface of the backing substrate. In an embodiment, step 302 and step 304 can be accomplished at the same time. In another embodiment, step 302 and step 304 can be accomplished separately. Step 306 includes disposing a layer of a polymeric make coat composition (also called herein a "make coat") on the front coat. Step 308 includes disposing a plurality of abrasive particles on or in the make coat. Step 310 includes disposing a polymeric size coat composition (also called herein a "size coat") over the abrasive particles and the make coat to form a coated abrasive film. The coated abrasive film can be used as a polishing film, formed into an abrasive belt (polishing belt), or converted (i.e., cut) into different shapes, such as discs, sheets, or other shapes.

Figure 4:
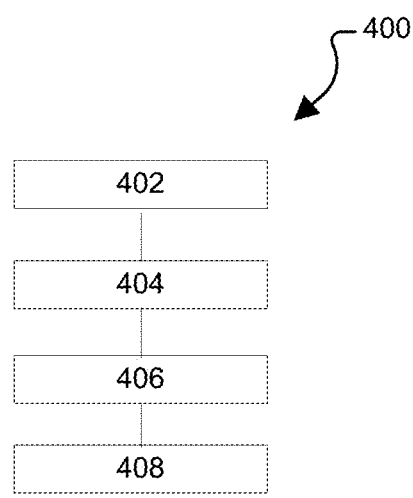
FIG. 4 is a flowchart of an embodiment of a method of making a coated abrasive film into a coated abrasive film belt.

FIG. 4 is an illustration of a flowchart of an embodiment of a method 400 of making an abrasive belt from the abrasive film produced by method 300. Step 402 includes bringing a first end of the abrasive film into contact with a second end of the abrasive film to form a joint such that the first end and the second end abut each other and the abrasive film forms a loop. Step 404 includes disposing a joint adhesive on the back coat of the first end and the second end in a region adjacent the joint. Step 406 includes disposing a joint tape over the joint adhesive. Step 408 includes applying pressure and heat to adhere the joint tape and cure the joint adhesive.

Backing Material

As previously stated, the backing material 101 ("backing") comprises a backing substrate 105 having a first major surface 109 ("first side") and a second major surface 107 ("second side"), wherein a layer of a polymeric front coat composition 111 (also called herein a "front coat") is disposed on the first major surface 109 of the backing substrate, and wherein a layer of polymeric back coat composition 113 (also called herein a "back coat") is disposed on the second major surface 107 of the backing substrate. In an embodiment, the backing material 101 can be beneficially flexible but also is resistant to curling and lays flat when at rest. The backing material 101 can comprise a proper combination of desired physical, chemical, mechanical, and/or performance properties and/or features to produce advantageous abrasive performance in combination with abrasive particles as described in greater detail herein.

Backing Substrate

The backing substrate can comprise a polymeric film, such as polyolefin film (e.g., polypropylene including biaxially oriented polypropylene), a polyester film (e.g., polyethylene terephthalate), a polyamide film, or a cellulose ester film; a metal foil; a mesh; a foam (e.g., natural sponge material or polyurethane foam); a cloth (e.g., cloth made from fibers or yarns comprising polyester, nylon, silk, cotton, poly-cotton, rayon, or combinations thereof); a paper; a vulcanized paper; a vulcanized rubber; a vulcanized fiber; a nonwoven material; a combination thereof. In an embodiment, the polymeric film can be a surface energy modified film, such as a primed film, a corona treated film, a plasma treated film, a chemically treated film, or a combination thereof. In a specific example, the backing substrate can comprise a polyester film that has been chemically primed and corona treated or plasma treated. Suitable chemical primers can include imide type primers, such as polyethylene imine, and the like.

The backing substrate can have a surface energy in a beneficial range. In an embodiment, the surface energy of the film can be not less than 5 dyne/cm$^2$, such as at least 10 dyne/cm$^2$, at least 20 dyne/cm$^2$, at least 30 dyne/cm$^2$, at least 40 dyne/cm$^2$, at least 45 dyne/cm$^2$ or at least 50 dyne/cm$^2$. In an embodiment, the surface energy can be not greater than 100 dyne/cm$^2$, such as not greater than 90 dyne/cm$^2$, not greater than 80 dyne/cm$^2$, not greater than 70 dyne/cm$^2$, not greater than 65 dyne/cm$^2$, or not greater than 60 dyne/cm$^2$. The amount of surface energy can be within a range comprising any pair of the previous upper and lower limits. In an embodiment, the polymeric film can have an amount of surface energy not less than 5 dyne/cm$^2$ to not greater than 100 dyne/cm$^2$, such as 20 dyne/cm$^2$ to 90 dyne/cm$^2$, such as 30 dyne/cm$^2$ to 80 dyne/cm$^2$, such as 40 dyne/cm$^2$ to 70 dyne/cm$^2$, or 50 dyne/cm$^2$ to 60 dyne/cm$^2$.

The backing substrate can have a thickness in a beneficial range. In an embodiment, the thickness of the film can be not less than 1 mil, such as at least 2 mil, at least 2.5 mil, at least 3 mil, at least 3.5 mil, at least 4 mil, or at least 4.5 mil. In an embodiment, the thickness can be not greater than 9 mil, such as not greater than 8 mil, not greater than 7.5 mil, not greater than 7 mil, not greater than 6.5 mil, or not greater than 6 mil. The amount of thickness can be within a range comprising any pair of the previous upper and lower limits. In an embodiment, the polymeric film can have an amount of thickness not less than 1 mil to not greater than 9 mil, such as 2 mil to 8 mil, such as 2.5 mil to 7.5 mil, such as 3 mil to 7 mil, or 50 mil to 60 mil.

Front Coat

In an embodiment, a layer of a polymeric front coat composition 111 (a "front coat") is disposed on the first major surface 109 of the backing substrate. In an embodiment, the polymeric front coat composition can comprise a polyethylene composition. The polyethylene composition can comprise a low-density polyethylene (LDPE), a linear low-density polyethylene (LLDPE), a high-density polyethylene (HDPE), a medium-density polyethylene (HDPE), or an ultra-high-molecular-weight polyethylene (UHMWPE). In a specific embodiment, the polymeric front coat composition comprises a low-density polyethylene.

The front coat can have a thickness in a beneficial range. In an embodiment, the thickness of the film can be not less than 0.25 mil, such as at least 0.5 mil, at least 0.75 mil, at least 1.0 mil, at least 1.25 mil, at least 1.5 mil, or at least 1.75 mil. In an embodiment, the thickness can be not greater than 5 mil, such as not greater than 4 mil, not greater than 3.5 mil, not greater than 3 mil, not greater than 2.75 mil, or not greater than 2.5 mil. The amount of thickness can be within a range comprising any pair of the previous upper and lower limits. In an embodiment, the polymeric film can have an amount of thickness not less than 0.25 mil to not greater than 5 mil, such as 1 mil to 3 mil, such as 1.5 mil to 2.5 mil.

Back Coat

In an embodiment, a layer of polymeric back coat composition 113 (a "back coat") is disposed on the second major surface 107 of the backing substrate. In an embodiment, the polymeric back coat composition can comprise an acrylate composition. The acrylate composition can comprise an ethyl acrylate, an ethylene acrylate, an ethylene-ethyl acrylate (EEA), a methyl acrylate, an ethylene methyl acrylate (EMA) copolymer, a butyl acrylate, a copolymer of ethylene and butyl acrylate (EBA), an ethylene acrylic ester terpolymer (i.e., a terpolymer of ethylene, acrylic ester, and maleic anhydride), or a combination thereof. In a specific embodiment, the back coat composition comprises a mixture of 1) a copolymer of ethylene and butyl acrylate (EBA), and 2) an ethylene acrylic ester terpolymer (i.e., a terpolymer of ethylene, acrylic ester, and maleic anhydride).

The back coat can have a thickness in a beneficial range. In an embodiment, the thickness of the film can be not less than 0.1 mil, such as at least 0.2 mil, at least 0.3 mil, at least 0.4 mil, at least 0.5 mil, at least 0.6 mil, at least 0.7 mil, or at least 0.8 mil. In an embodiment, the thickness can be not greater than 3 mil, such as not greater than 2 mil, not greater than 1.8 mil, not greater than 1.7 mil, not greater than 1.6 mil, not greater than 1.5 mil, not greater than 1.4 mil, not greater than 1.3 mil, or not greater than 1.2 mil. The amount of thickness can be within a range comprising any pair of the previous upper and lower limits. In an embodiment, the polymeric film can have an amount of thickness not less than 0.1 mil to not greater than 3 mil, such as 0.25 mil to 2.5 mil, such as 0.5 mil to 2 mil.

Belt Joint

In an embodiment, the coated abrasive belt can comprise an abrasive film including a joint (also called herein a "splice"). In an embodiment, the joint can comprise a lap joint, a butt joint, or a combination thereof. The joint can be reinforced, such as with a tape or other suitable supporting substrate. The joint can include a joint adhesive. In an embodiment, the joint can be a butt joint that includes a joint tape and a joint adhesive.

In an embodiment, a joint tape can comprise a polymeric film (including primed films), such as a polyolefin film (e.g., polyethylene or polypropylene, including biaxially oriented polypropylene), a polyester film (e.g., polyethylene terephthalate or a liquid crystal polymer), a polyamide film, a cellulose ester film, or any combination thereof; a metal foil; a mesh; a foam (e.g., natural sponge material or polyurethane foam); a cloth (e.g., cloth made from fibers or yarns comprising polyester, nylon, silk, cotton, poly-cotton or rayon); a paper; a nonwoven material; or any combination thereof. In specific embodiment, the joint tape can comprise a polymer film such as a polyester film, a polyamide film, a polyaramid film, a polyimide film, a polyolefin, or any combination thereof. In a particular embodiment, the joint tape can include a polyethylene terephthalate (PET) film.

In an embodiment, a joint adhesive can comprise a polyolefin composition, a polyamide composition, an acrylic composition, an epoxy composition, a polyester composition, a polyurethane composition, or a combination thereof. In a specific embodiment, the joint adhesive can be an epoxy composition, a polyester composition, or a polyurethane composition.

Abrasive Layer

In an embodiment, the abrasive layer can include a plurality of abrasive particles 117 dispersed on or in a layer of polymeric binder 115 ("make coat"). In an embodiment, the abrasive particles can be blended together with the polymeric binder to form an abrasive slurry wherein the abrasive particles are dispersed throughout the binder formulation. Alternatively, the polymeric binder composition can be coated onto the backing material and the abrasive particles then applied over the binder composition. Optionally, patterns can be formed in the abrasive layer by molding, pressing, or tooling of the abrasive layer.

Abrasive Particles

Abrasive particles can include alumina, silicon carbide, silica, ceria, and harder, high performance superabrasive particles such as cubic boron nitride and diamond. The abrasive particles can be essentially single-phase inorganic materials, mixed phase materials, or combinations thereof. Additionally, the abrasive particles can include composite particulate materials, such as aggregates, which can be formed through slurry processing pathways that include removal of the liquid carrier through volatilization or evaporation, leaving behind unfired ("green") aggregates, that can optionally undergo high temperature treatment (i.e., firing, sintering) to form usable, fired aggregates. Further, the abrasive layer can include engineered abrasives including macrostructures and particular three-dimensional structures.

The abrasive particles can be formed of any one of or a combination of abrasive particles, including silica, alumina (ceramic, fused, or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive particles can be selected from a group consisting of silica, alumina, zirconia, silicon carbide, silicon nitride, boron nitride, garnet, diamond, co-fused alumina zirconia, ceria, titanium diboride, boron carbide, flint, emery, alumina nitride, and a blend thereof. Particular embodiments have been created by use of abrasive particles comprised of diamond.

In an embodiment, the abrasive particles can be diamond particles (also referred to herein as "diamonds"), cubic boron nitride particles, or combinations thereof. In an embodiment, the abrasive particles comprise diamonds. The diamonds can be monocrystalline, polycrystalline, or a combination thereof. The diamonds can be natural diamonds, synthetic diamonds, metal-coated diamonds, resin coated diamonds, or combinations thereof. The abrasive particles can be loose diamonds, diamond agglomerates, diamond aggregates, or a combination thereof.

In specific embodiments, superabrasive particles include cubic boron nitride and diamond particles. These superabrasive particles can be natural (e.g. natural diamond) or synthetic (e.g. cubic boron nitride and synthetic diamond) products. The superabrasive particles may have a blocky shape associated with them or alternatively, a needle-like shape. The superabrasive particles may be surface coated or not surface coated. In an embodiment, a blend of superabrasive particles and conventional abrasive particles (e.g. alumina, silicon carbide, ceria, and silica) can be used.

The abrasive particles can have a particular shape, such as a rod, a triangle, a pyramid, a cone, a solid sphere, a hollow sphere, or the like. Alternatively, the abrasive particles can be randomly shaped.

The abrasive particles can be in a beneficial size range, conform to a beneficial size distribution, or a combination thereof. In an embodiment, the abrasive particles can have an average particle size of not less than 1 micron, such as at least 2 micron, at least 3 micron, at least 5 micron, at least 10 micron, at least 15 micron, at least 20 micron, or at least 25 micron. In an embodiment, the average particle size can be not greater than 500 micron, such as not greater than 400 micron, not greater than 300 micron, not greater than 200 micron, not greater than 150 micron, or not greater than 125 micron. The average particle size can be within a range comprising any pair of the previous upper and lower limits. In an embodiment, the abrasive particles can have an average particle size not less than 5 micron to not greater than 250 micron, such as 10 micron to 200 micron, such as 15 micron to 150 micron, such as 20 micron to 125 micron.

Binder Composition—Make Coat or Slurry Coat

As stated previously, a layer of polymeric binder composition 115 can be disposed in direct contact with the polymeric front coat composition 111. In a particular aspect, the polymeric binder composition 115 can be comprised of a single polymer or a blend of polymers.

The binder composition can be formed from an epoxy composition, an acrylic composition, a phenolic composition, a polyurethane composition, a urea formaldehyde composition, a polysiloxane composition, or combinations thereof. In addition, the binder composition can include active filler particles, additives, or a combination thereof, as described herein.

The binder composition generally includes a polymer matrix, which binds abrasive particles to the backing or to a compliant coat, if such a compliant coat is present. Typically, the binder composition is formed of cured binder composition. In an embodiment, the binder composition includes a polymer component and a dispersed phase.

The binder composition can include one or more reaction constituents or polymer constituents for the preparation of a polymer. A polymer constituent can include a monomeric molecule, a polymeric molecule, or a combination thereof. The binder composition can further comprise components selected from the group consisting of solvents, plasticizers, chain transfer agents, catalysts, stabilizers, dispersants, curing agents, reaction mediators and agents for influencing the fluidity of the dispersion.

The polymer constituents can form thermoplastics or thermosets. By way of example, the polymer constituents can include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents are typically curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent, which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The binder composition can include a monomer, an oligomer, a polymer, or a combination thereof. In a particular embodiment, the binder composition includes monomers of at least two types of polymers that when cured can crosslink.

In an embodiment, the binder composition can include epoxy constituents and acrylic constituents that when cured form an epoxy/acrylic hybrid polymer. Alternatively, the binder composition can comprise a butyl acrylate polymer. In an embodiment, the binder composition can comprise a cycloaliphatic epoxy resin, a di-acrylate resin, or a combination thereof. In a specific embodiment, the binder composition can comprise a hydrogenated diphenylolpropane (DPP) epoxy resin, an oxetane resin (4-member cyclic ether), a bisphenol A Epoxy Diacrylate resin (diacrylate ester of a bisphenol A epoxy resin), a propoxylated neopentyl glycol diacrylate resin, or combinations thereof.

Size Coat Layer

As described above, layer of polymeric size coat composition 119 (a "size coat") can be disposed over the polymeric binder composition 115 and abrasive particles 117. The size coat composition 119 can be the same as or different from the polymeric binder composition 115 of the abrasive layer 103 (i.e., the size coat composition can be the same as or different from the make coat composition). The size coat composition can include one or more fillers, additives, or a combination thereof.

In a specific embodiment, the size coat composition 119 can comprise an epoxy resin, an acrylic resin, an acrylate resin, an epoxy acrylate resin, or a combination thereof. In an embodiment, the size coat composition can comprise a reinforcing additive, such as amorphous silica. In a specific embodiment, the size coat composition can comprise a cycloaliphatic epoxy resin, an epoxide, a diepoxide, a butanediol, a triacrylate, a hexaacrylate, a cyclohexylcarboxylate, or a combination thereof. In a specific embodiment, the size coat composition can comprise a silica reinforced cycloaliphatic epoxy resin, an aliphatic epoxidized butanediol, trimethylolpropane triacrylate (TMPTA), dipentaerythritol hexaacrylate (DPHA), (3,4-epoxycyclohexane) methyl 3,4-epoxycyclohexylcarboxylate, or a combination thereof.

In a specific embodiment, the size coat composition can include 5 wt % to 45 wt % of a reinforcing filler, such 10 wt % to 35 wt % of a reinforcing filler.

Supersize Coat Composition

As previously described, the coated abrasive article 100 can optionally comprise a layer of supersize coat composition (not shown) disposed on the size coat composition 119. The supersize coat composition can be the same as or different from the polymeric binder composition 115 of the abrasive layer 103 and can be same as or different than the size coat composition 119 disposed thereon. In another aspect, the supersize coat composition may comprise an anti-loading agent (such as a stearate, such as a metal stearate, such as zinc stearate or calcium stearate) or a grinding aid (such as cryolite, potassium borofluoride), or a combination thereof.

Additives

In a particular aspect, the front coat composition 111, the back coat composition 113, the binder composition 115, the size coat composition 119, or the supersize coat composition (not shown) can include one or more additives. Additives can be available in an amount of 0 wt % to 10 wt % of any polymer layer (i.e., make coat layer, size coat layer, or supersize layer). Suitable additives, for example, can include grinding aids, fibers, lubricants, wetting agents, thixotropic materials, surfactants, thickening agents, pigments, dyes, antistatic agents, coupling agents, plasticizers, suspending agents, pH modifiers, adhesion promoters, lubricants, bactericides, fungicides, flame retardants, degassing agents, anti-dusting agents, dual function materials, initiators, chain transfer agents, stabilizers, dispersants, reaction mediators, colorants, and defoamers. The amounts of these additive materials can be selected to provide the properties desired. These optional additives can be present in any part of the overall system of the coated abrasive product according to embodiments of the present disclosure. Suitable grinding aids can be inorganic based; such as halide salts, for example cryolite, wollastonite, and potassium fluoroborate; or organic based, such as sodium lauryl sulphate, or chlorinated waxes, such as polyvinyl chloride. In an embodiment, the grinding aid can be an environmentally sustainable material.

EMBODIMENTS

Embodiment 1

An abrasive belt comprising: an abrasive film having a joint; wherein the abrasive film comprises an abrasive layer disposed on a backing material; wherein the backing material comprises: a backing substrate having a first side and a second side; and a back coat disposed on the second side of the backing substrate; and wherein the joint comprises: a first end of the abrasive film abutting a second end of the abrasive film; a polymeric joint adhesive disposed on the back coat of the first end and the back coat of the second end; and a joint tape disposed over the polymeric joint adhesive.

Embodiment 2

The abrasive belt of embodiment 1, further comprising a Triple Head Test rating of at least 10 minutes, such as at least 15 minutes, at least 20 minutes, or at least 30 minutes.

Embodiment 3

The abrasive belt of embodiment 1, wherein the back coat comprises a layer of a polymeric acrylate composition.

Embodiment 4

The abrasive belt of embodiment 3, wherein the polymeric acrylate composition comprises an ethyl acrylate, an ethylene acrylate, an ethylene-methyl acrylate, an ethylene-ethyl acrylate, or a combination thereof.

Embodiment 5

The abrasive belt of embodiment 4, wherein the layer of polymeric acrylate composition comprises a thickness of at least 0.1 mil to not greater than 3 mil, such as at least 0.25 mil to not greater than 2.5 mil, or at least 0.5 mil to not greater than 2 mil.

Embodiment 6

The abrasive belt of embodiment 1, further comprising a front coat disposed on the first side of the backing substrate between the abrasive layer and the backing substrate.

Embodiment 7

The abrasive belt of embodiment 6, wherein the front coat comprises a layer of a polymeric ethylene composition.

Embodiment 8

The abrasive belt of embodiment 7, wherein the polymeric polyethylene composition comprises a low-density polyethylene, a high-density polyethylene, or a combination thereof.

Embodiment 9

The abrasive belt of embodiment 8, wherein the polymeric polyethylene composition comprises a thickness of at least 0.25 mil to not greater than 5 mil, such as at least 1 mil to not greater than 3 mil, or at least 1.5 mil to not greater than 2.5 mil.

Embodiment 10

The abrasive belt of embodiment 1, wherein the backing substrate comprises a polymeric film.

Embodiment 11

The abrasive belt of embodiment 10, wherein the polymeric film comprises a polyester film.

Embodiment 12

The abrasive belt of embodiment 10, wherein the polymeric film comprises polyethylene terephthalate.

Embodiment 13

The abrasive belt of embodiment 10, wherein the polymeric film comprises a thickness of at least 1 mil to not greater than 10 mil, such as at least 2 mil to not greater than 8 mil, at least 3 mil to not greater than 7 mil, or at least 4 mil to not greater than 6 mil.

Embodiment 14

The abrasive belt of embodiment 10, wherein the polymeric film comprises a surface energy of at least 40 dyne/cm2, such as at least 45 dyne/cm2, as at least 50 dyne/cm2, as at least 55 dyne/cm2.

Embodiment 15

The abrasive belt of embodiment 14, wherein the polymeric film is corona treated.

Embodiment 16

The abrasive belt of embodiment 15, wherein the corona treatment increases the surface energy 5 to 50 dyne/cm2, such as 10 to 35 dyne/cm2.

Embodiment 17

The abrasive belt of embodiment 1, wherein the joint comprises a butt joint.

Embodiment 18

The abrasive belt of embodiment 17, wherein the joint includes a surface energy treatment in a region adjacent the joint.

Embodiment 19

The abrasive belt of embodiment 18, wherein the surface treatment increases the surface energy by 10-30 Dynes/cm2.

Embodiment 20

The abrasive belt of embodiment 18, wherein the surface treatment comprises a corona treatment, a plasma treatment, or a combination thereof.

Embodiment 21

The abrasive belt of embodiment 1, wherein the abrasive layer comprises a polymeric make coat composition and abrasive particles disposed in the make coat composition.

Embodiment 22

The abrasive belt of embodiment 21, wherein the make coat composition comprises an epoxy acrylate polymer, an epoxy methacrylate polymer, a butyl acrylate polymer, or a combination thereof.

Embodiment 23

The abrasive belt of embodiment 21, wherein the make coat composition further comprises a filler.

Embodiment 24

The abrasive belt of embodiment 21, wherein the abrasive layer further comprises a polymeric size coat composition disposed on the make coat composition and abrasive particles.

Embodiment 25

The abrasive belt of embodiment 21, wherein the size coat composition comprises an epoxy acrylate polymer, an epoxy methacrylate polymer, a butyl acrylate polymer, or a combination thereof.

Embodiment 26

The abrasive belt of embodiment 21, wherein the make coat composition further comprises a filler.

Embodiment 27

The abrasive belt of embodiment 21, wherein the abrasive particles comprise diamond, cubic boron nitride, or a combination thereof.

Embodiment 28

The abrasive belt of embodiment 21, wherein the abrasive particles comprise a grit size of 10 microns to 500 microns.

EXAMPLES

Example 1.—Sample Coated Abrasive Belt Preparation

A sample coated abrasive film belt was prepared as described herein. In a first step, a backing material was prepared by applying a front coat and a back coat to a backing substrate. Details of the backing material are provided below in Table 1. The completed backing material was stored for later use.

TABLE 1

| Backing Material | |
| --- | --- |
| S1 | |
| Front Coat | Low density polyethylene |
| Backing Substrate | Polymer film[1], primed[2], and corona treated[3] |
| Back Coat | Copolymer Blend |
| | 90-95 wt % ethylene and butyl acrylate copolymer[4] |
| | 05-10 wt % ethylene acrylic ester terpolymer[5] |

[1]Chemically treated PET film, 5 mil thick
[2]Primer - polyethylene imine
[3]50-60 dyne/cm$^2$, both sides
[4]Lotryl, Arkema, Inc.
[5]Lotader, Arkema, Inc.

The prepared backing material was then used to make a sample coated abrasive film as described herein. A make coat was applied to the backing material wherein the make coat was disposed onto the front coat of the backing material. Abrasive particles were disposed on the make coat and a size coat was applied over the make coat and abrasive particles. Details of the make coat, abrasive particles, and size coat are provided below in Table 2. The completed coated abrasive film was stored as a jumbo roll for later use.

TABLE 2

| Coated Abrasive Film | |
| --- | --- |
| S1 | |
| Size Coat | UV curable copolymer blend |
| | 40-65 wt % epoxy resin 3[9] |
| | 10-20 wt % epoxy resin 4[10] |
| | 1-10 wt % acrylate resin 2[11] |
| | 0-5 wt % acrylate resin 3[12] |
| | 0-5 wt % epoxy acrylate resin[13] |
| | 10-20 wt % filler[14] |

TABLE 2-continued

Coated Abrasive Film

| | S1 |
|---|---|
| Abrasive Particles | Metal bond diamond, 65-75 micron |
| Make Coat | UV curable copolymer blend<br>55-75 wt % epoxy resin 1[6]<br>05-12 wt % epoxy resin 2[7]<br>10-20 wt % oxetane<br>1-08 wt % acrylate resin[8] |

[6]Diphenylolpropane (DPP) resin - Eponex
[7]Bisphenol A Epoxy Diacrylate - Ebecryl
[8]Propoxylated neopentyl glycol diacrylate - Sartomer
[9]Silica reinforced cycloaliphatic epoxy resin (Nanopox)
[10]Aliphatic epoxidized butanediol (Erisyg)
[11]Trimethylolpropane triacrylate (TMTPA)
[12]Dipentaerythritol hexaacrylate (DPHA)
[13]methyl 3,4-epoxycyclohexylcarboxylate
[14]Amorphous silica

Example 2.—Sample Abrasive Belt Preparation

Sample coated abrasive film belts were prepared as described herein. Sample coated abrasive polishing film as prepared above in Example 1 was obtained from a jumbo roll and slit (i.e., cut) into a plurality of 10 in×30 in panels, which were then used to make sample abrasive film belts.

A corona surface treatment was first applied to each end of the polishing film panels using a hand held corona treatment unit (Electro Technic Products, Inc.) with a round electrode. Four passes of the corona treatment unit were made along the edge of the end of each panel. The electrode distance was ⅛ inch to ¼ inch away from the abrasive film during treatment. Prior to corona treatment, the initial surface energy of each of the abrasive film ends was about 30-32 dyne/cm². After corona treatment, the final surface energy of each of the abrasive film ends was about 40-62 dyne/cm², typically 45-60 dyne/cm² (an increase of 10-30 dyne/cm²). A joint adhesive (a hot melt polyurethane adhesive composition) was applied with a roller to the back coat of each end of the abrasive film. The ends were brought together to form a butt joint and a polymer film joint tape was applied over the joint and the joint adhesive in the region around the joint. Heat (190° F.) and pressure (800 lbf) were applied (5 sec.) using a belt joiner press to complete the joint and form the abrasive belt.

Example 3.—Sample Abrasive Film Belt Testing

Sample coated abrasive film belts S1 and comparative abrasive film belts C1 and C2 were prepared as described herein. The details of the abrasive belts are provided in Table 3. The construction of the sample and comparative belts was the same except as indicated in Table 3. The sample and comparative abrasive film belts were subjected to testing (Triple Head Test—30 psig; 0.5 IN Spindle; 30 minutes max. duration) to evaluate the strength and durability of the abrasive film belts and their joints. The testing results are shown in Table 3.

TABLE 3

Backing Material

| | S1 | C1 | C2 |
|---|---|---|---|
| Backing Substrate | Polymer film (see Example 1 above) | Same as S1 | Same as S1 |
| Back Coat | Ethylene acrylate copolymer blend (see Example 1 above) | Same as S1 | Low density polyethylene |
| Corona Treatment | Yes (see example 2 above) | — | Same as S1 |
| Joint adhesive | Hot Melt Polyurethane (see example 2 above) | Same as S1 | Same as S1 |
| Joint Tape | Yes (see example 2 above) | Same as S1 | Same as S1 |
| Triple Head Test Overall Result | Full Pass | Partial Pass | Fail |
| Triple Head Test Avg. Time to Failure | +30 minutes Max. duration reached | 12.3 minutes | 0.1 minutes |

Significantly, all sample abrasive film belts S1 did not break and reached the 30-minute maximum duration of the test.

Example 4.—Sample Abrasive Film Belt Testing

Figure 5:
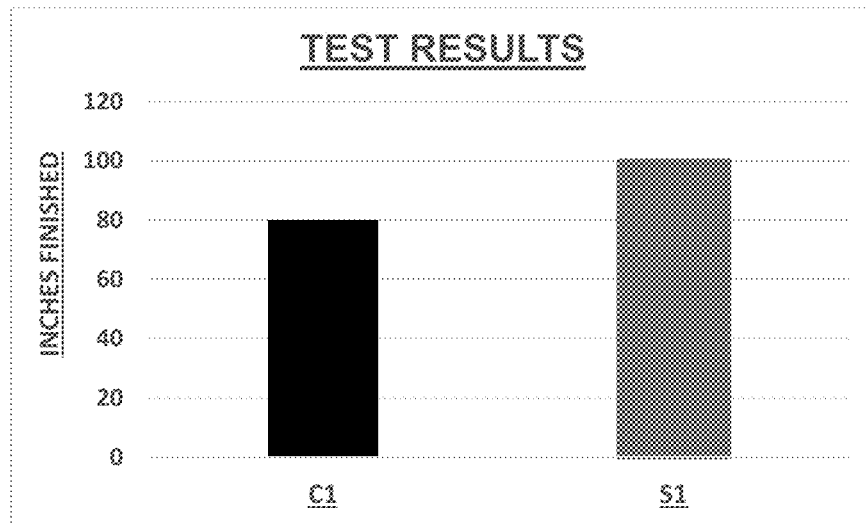
FIG. 5 is a chart providing comparative data of workpiece processing amounts of conventional abrasive articles and other embodiments of abrasive articles of the disclosure.

A polishing lathe having a 3 horsepower motor that turns a workpiece at speeds of 1 to 100 revolutions per minute utilizes a belt size of 2"×120" and a maximum part length of 360". Sample coated abrasive film belts S1 and comparative abrasive film belts C1 were run as slack of belt using no supporting wheel. The workpiece (e.g., rotor) was formed from stainless steel and had a High Velocity Oxygen Fuel (HVOF) spray coating applied to the rotor at a thickness between 0.008" and 0.015" depending on the base surface. The rotors typically take 15 to 18 hours to finish. Sample abrasive film belt S1 showed a 20% performance boost and finished 100 inches of the rotor, while comparative abrasive film belt C1 only finished 80" of the rotor. The results are shown in FIG. 5. Sample abrasive film belt S1 also showed a 25% better surface finish.

Example 5.—Sample Abrasive Film Belt Testing

Figure 6:
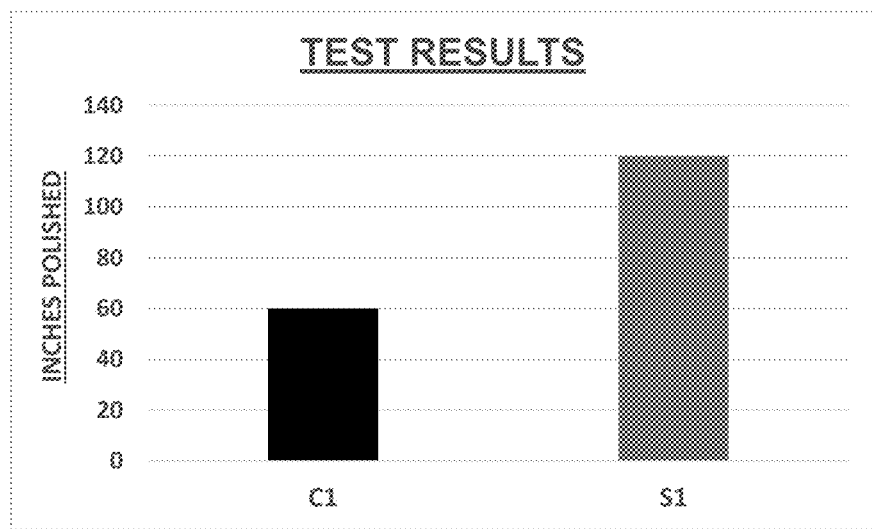
FIG. 6 is a chart providing comparative data of workpiece processing amounts for conventional abrasive articles and other embodiments of abrasive articles of the disclosure.

A polishing lathe having a 3 horsepower motor that turns a workpiece at speeds of 1 to 100 revolutions per minute utilizes a belt size of 2"×120" and a maximum part length of 360". Sample coated abrasive film belts S1 and comparative abrasive film belts C1 were used in conjunction with a 6" rubber contact roll in the polishing lathe. The workpiece (e.g., rotor) was formed from stainless steel and had a High Velocity Oxygen Fuel (HVOF) spray coating applied to the rotor at a thickness between 0.010" and 0.025" depending on the base surface. Sample abrasive film belt S1 finished 120 inches of the rotor, while comparative abrasive film belt C1 only finished 60" of the rotor. The results are shown in FIG. 6.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Moreover, not all of the activities described above in the general description or the examples are required, that a portion of a specific activity cannot be required, and that one or more further activities can be performed in addition to those described. Still further, the order in which activities are listed is not necessarily the order in which they are performed.

The disclosure is submitted with the understanding that it will not be used to limit the scope or meaning of the claims. In addition, in the foregoing disclosure, certain features that are, for clarity, described herein in the context of separate embodiments, can also be provided in combination in a single embodiment. Conversely, various features that are, for brevity, described in the context of a single embodiment, can also be provided separately or in any subcombination. Still, inventive subject matter can be directed to less than all features of any of the disclosed embodiments.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An abrasive belt comprising:
   an abrasive film having a joint;
   wherein the abrasive film comprises an abrasive layer disposed on a backing material;
   wherein the backing material comprises:
      a backing substrate having a first side and a second side; and
      a back coat disposed on the second side of the backing substrate;
   wherein the back coat comprises a layer of a polymeric acrylate composition with a thickness of at least 0.1 mil to not greater than 3 mil, wherein the polymeric acrylate composition comprises an ethyl acrylate, an ethylene acrylate, an ethylene-methyl acrylate, an ethylene-ethyl acrylate, or a combination thereof; and
   wherein the joint comprises:
      a first end of the abrasive film abutting a second end of the abrasive film;
      a polymeric joint adhesive disposed on the back coat of the first end and the back coat of the second end; and
      a joint tape disposed over the polymeric joint adhesive.

2. The abrasive belt of claim 1, further comprising: a Triple Head Test rating of at least 10 minutes.

3. The abrasive belt of claim 1, wherein the polymeric acrylate composition comprises an ethylene acrylate.

4. The abrasive belt of claim 3, wherein the polymeric acrylate composition comprises an ethyl acrylate.

5. The abrasive belt of claim 4, wherein the polymeric acrylate composition comprises a thickness of at least 0.25 mil to not greater than 2.5 mil.

6. The abrasive belt of claim 1, further comprising: a front coat disposed on the first side of the backing substrate between the abrasive layer and the backing substrate.

7. The abrasive belt of claim 6, wherein the front coat comprises a layer of a polymeric polyethylene composition.

8. The abrasive belt of claim 7, wherein the polymeric polyethylene composition comprises a low-density polyethylene, a high-density polyethylene, or a combination thereof.

9. The abrasive belt of claim 8, wherein the polymeric polyethylene composition comprises a thickness of at least 0.25 mil to not greater than 5 mil.

10. The abrasive belt of claim 1, wherein the backing substrate comprises a polymeric film formed from at least one of polyester and polyethylene terephthalate.

11. The abrasive belt of claim 10, wherein the polymeric film comprises a thickness of at least 1 mil to not greater than 10 mil.

12. The abrasive belt of claim 10, wherein the polymeric film comprises a surface energy of at least 40 dyne/cm$^2$.

13. The abrasive belt of claim 12, wherein the polymeric film is corona treated, and wherein the corona treatment increases the surface energy 5 to 50 dyne/cm$^2$.

14. The abrasive belt of claim 1, wherein the joint comprises a butt joint.

15. The abrasive belt of claim 14, wherein the joint includes a surface energy treatment comprising a corona treatment, a plasma treatment, or a combination thereof, in a region adjacent the joint, and wherein the surface treatment increases the surface energy by 10-30 Dynes/cm$^2$.

16. The abrasive belt of claim 1, wherein the abrasive layer comprises a polymeric make coat composition and abrasive particles disposed in the make coat composition.

17. The abrasive belt of claim 16, wherein the abrasive layer further comprises a polymeric size coat composition disposed on the make coat composition and abrasive particles.

18. The abrasive belt of claim 17, wherein at least one of the make coat composition and the size coat composition comprises an epoxy acrylate polymer, an epoxy methacrylate polymer, a butyl acrylate polymer, or a combination thereof.

19. The abrasive belt of claim 16, wherein the abrasive particles comprise diamond, cubic boron nitride, or a combination thereof.

20. The abrasive belt of claim 19, wherein the abrasive particles comprise a grit size of 10 microns to 500 microns.

* * * * *